United States Patent
Garry

(10) Patent No.: US 8,071,911 B2
(45) Date of Patent: Dec. 6, 2011

(54) METHOD AND APPARATUS FOR MACHINING USING A BEAM AND A BEAM TRAP

(75) Inventor: Ian M. Garry, Thurcaston (GB)

(73) Assignee: Rolls-Royce PLC, London (GB)

( * ) Notice: Subject to any disclaimer, the term of this patent is extended or adjusted under 35 U.S.C. 154(b) by 987 days.

(21) Appl. No.: 12/010,385

(22) Filed: Jan. 24, 2008

(65) Prior Publication Data

US 2008/0179303 A1 Jul. 31, 2008

(30) Foreign Application Priority Data

Jan. 26, 2007 (GB) .................................. 0701509.2

(51) Int. Cl.
*B23K 26/38* (2006.01)
*B23K 26/06* (2006.01)
*G02B 27/00* (2006.01)

(52) U.S. Cl. ............ 219/121.71; 219/121.7; 219/121.73; 359/614

(58) Field of Classification Search ................ 219/121.7, 219/121.71, 121.18, 121.73; 359/613, 614
See application file for complete search history.

(56) References Cited

U.S. PATENT DOCUMENTS

| | | | | |
|---|---|---|---|---|
| 4,737,000 A | * | 4/1988 | Garlick et al. | 250/368 |
| 4,894,509 A | * | 1/1990 | Chalco et al. | 219/121.6 |
| 5,237,454 A | * | 8/1993 | Snyder | 359/602 |
| 5,516,998 A | * | 5/1996 | Chatelain et al. | 219/121.7 |
| 5,667,708 A | | 9/1997 | Glass et al. | |
| 6,032,361 A | | 3/2000 | Makino et al. | |
| 6,486,436 B1 | * | 11/2002 | Shah et al. | 219/121.82 |
| 2004/0022296 A1 | * | 2/2004 | Sukhman et al. | 372/109 |

FOREIGN PATENT DOCUMENTS

| | | |
|---|---|---|
| DE | 30 27 590 A1 | 2/1982 |
| DE | 100 33 787 A1 | 1/2002 |
| EP | 0 347 053 A3 | 12/1989 |
| JP | A-61-269996 | 11/1986 |
| JP | A-62-011135 | 1/1987 |
| JP | 8-66788 A * | 3/1996 |
| WO | WO 94/23884 A1 | 10/1994 |
| WO | WO 2007/028403 A1 | 3/2007 |

OTHER PUBLICATIONS

Machine translation of the claims of Japan Patent No. 8-66,788, Mar. 2011.*

* cited by examiner

*Primary Examiner* — Geoffrey S Evans
(74) *Attorney, Agent, or Firm* — Oliff & Berridge, PLC

(57) ABSTRACT

A combustor component with cooling apertures has the apertures formed by laser drilling. The machining apparatus comprises a beam generator for generating a beam for directing at the combustor component and a beam trap. The component is translated relative to the beam and the beam is directed to the beam trap and is dissipated within the beam trap.

11 Claims, 2 Drawing Sheets

METHOD AND APPARATUS FOR MACHINING USING A BEAM AND A BEAM TRAP

The invention relates to a method and apparatus for producing an apertured component. The invention is applicable in particular to the production of components for gas turbines, such as combustor cooling rings.

Gas turbine engines operate at extremely high temperatures for increased performance and efficiency. A limiting factor in most gas turbine engine designs, however, is the maximum temperature that various components of the engine can tolerate. One such particular component area which is so limited is the combustion chamber of a gas turbine engine.

One method to increase the maximum allowable temperature and/or decrease the component metal temperature is to provide cooling holes in the walls of the component. These holes allow cool air to flow through and along the walls of the component exposed to the high gas temperatures. As the air flows along the surface of the walls it forms a cool layer. This cool layer reduces the temperature of the wall surface and physically keeps the hot gases from contacting the walls of the component, thereby permitting the component to withstand higher gas temperatures than would otherwise be possible.

The cooling holes are typically formed from laser drilling and are generally angled in the flow direction to promote the formation of a layer of cool air along the inside of the flame tube walls.

Combustor components are generally cylindrical or annular and one method of laser drilling provides a stationary laser and a rotatable combustor component. The laser is a continuous wave $CO_2$ laser and directed at the component till a perforation is made. The laser is then switched off and the component rotated to bring the next desired hole location into position for ablation by the laser.

After breakthrough the beam is incident to a single position and, depending on the machinery used, may be reflected causing damage to both the component, component support or the machine enclosure with potential health and safety implications.

It is an object of the invention to provide a method and an apparatus that seeks to address these and other problems.

According to a first aspect of the invention there is provided machining apparatus comprising a beam generator for generating a beam for directing at a component to be machined, a beam generated by the beam generator, a beam trap having opposing faces, wherein the beam is directed to the beam trap and is dissipated by repeated reflection off the first to the second face and off the second face to the first face.

The opposing faces may be parallel. Preferably the opposing faces are provided by aluminium plates. The beam trap may comprise an aperture through which the beam enters the beam trap.

The machining apparatus may further comprise a component to be machined. The beam generator and the beam trap may be in fixed arrangement and the component arranged to move relative to the beam generator. Preferably the component rotates relative to the beam generator. The component may be annular. The component may provide at least part of a combustor for a gas turbine engine.

The beam may be a laser beam and preferably a CO2 laser.

According to a second aspect of the invention there is provided a method of machining a component comprising the steps directing a beam at the component from a beam generator to form a hole within the component, subsequently passing the beam through the hole to a beam trap comprises a first surface and a second opposing surface wherein the beam directed to the beam trap is reflected off the first surface to the second opposing surface.

The invention will now be described by way of example only with reference to accompanying figures in which.

Annular combustion chambers consist of a single flame tube that is annular in form and contained in an inner and outer combustor casing. At the upstream end of the combustor a combustor head is provided with a plurality of circumferentially spaced apertures through which fuel injectors are inserted to supply atomised fuel to the interior of the combustion chamber, where it is ignited.

Figure 1:
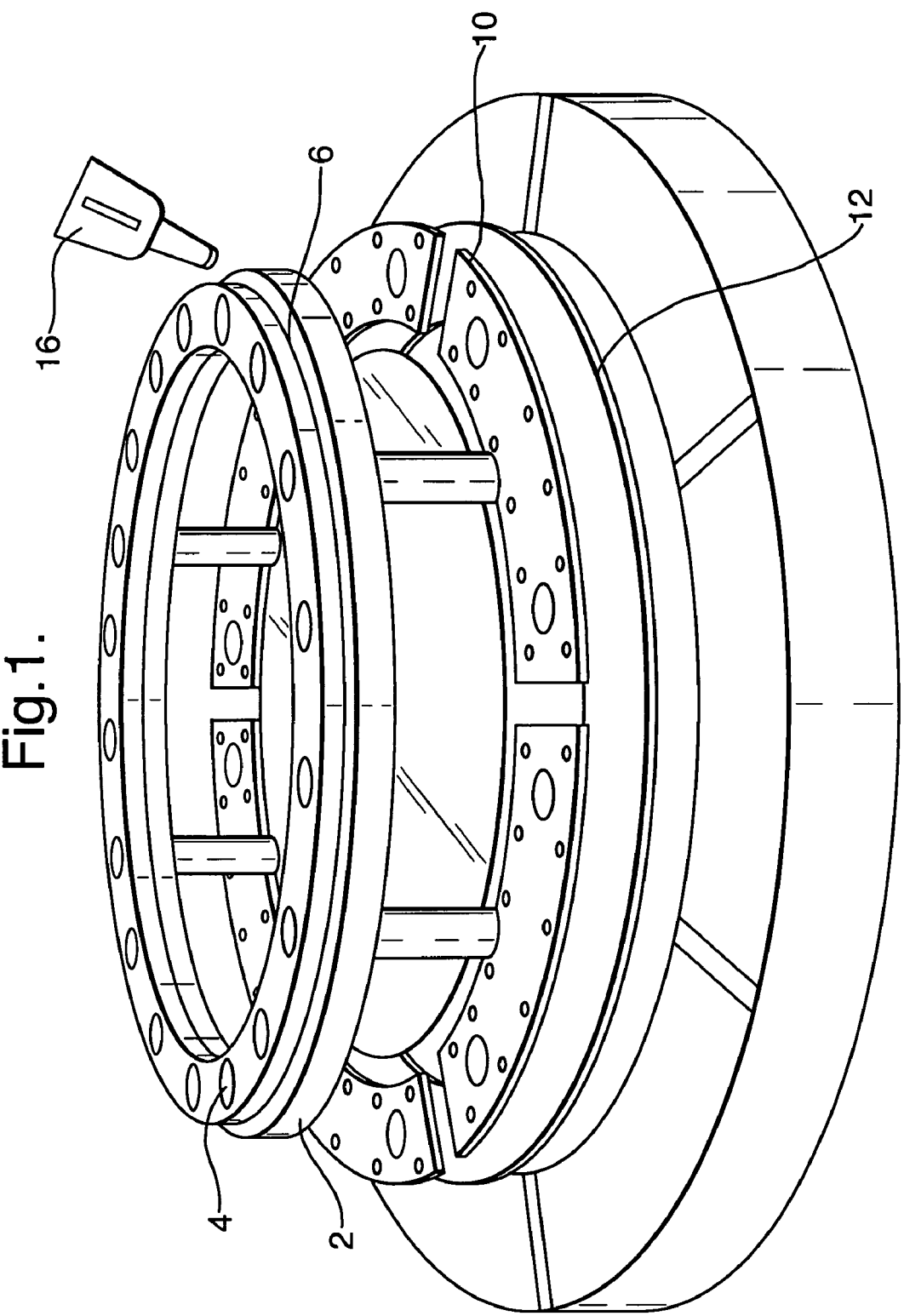
FIG. 1 depicts a combustor head mounted on a manufacturing jig incorporating a beam trap of the present invention.

The combustor head 2 in FIG. 1 is made from metal, generally a high temperature alloy for example a nickel cobalt or iron superalloy, which is fabricated into the required shape. The thickness of the metal walls is typically between 1-1.6 mm.

The fuel injection apertures are typically formed during the casting process during which the combustor head is formed.

Also provided in the combustor head 2 is a number of smaller cooling apertures. These are located on an annular step and are arranged in a uniform, circumferentially extending, annular array and allow cooling air to be supplied to the combustion chamber in an effusion film that follows the wall of the combustor and helps to maintain an acceptable temperature at the wall.

The holes are of a size that makes them difficult to cast and casting does not lend itself to the uniformity to which the holes must be formed. Consequently, the cooling holes which have a diameter of 0.25 mm-0.75 mm are formed after the combustor head is formed and are cut using a laser.

The preferred laser is a continuous wave CO2 laser. The laser is located in a fixed relationship with a rotating table, upon which the combustor head is mounted. $CO_2$ lasers are preferred as they provide a high energy beam which enables quick perforation of the combustor casing.

The laser is fixed which means the beam follows the same path each time the laser is powered. In operation the table is rotated to present the combustor head such that the beam will be focussed and incident at the desired location of the first cooling aperture. The laser is then operated to generate the high energy beam till the aperture is formed. Once the aperture is made the beam is turned off and the table rotated to next aperture location which is drilled as before.

It will be appreciated that upon breakthrough of the beam through the combustor head the beam there is a finite period of time before the breakthrough is detected and the beam switched off. For that finite time period the beam is incident on the next object in its path, typically another portion of the combustor or the machine housing. Whilst the beam may not be focussed on the next object it contains significant energy which may damage the object.

As the laser is in a fixed position and the beam follows the same path every time an aperture is formed if the next object is also a static object the beam is repeatedly incident upon that point leading, over a period of time, to irreparable damage of that component, which may be expensive to repair.

Even if the object is significantly reflective to reflect the beam without sustaining damage then the beam is similarly reflected to a single position which can still result in damage to the combustor components, or machine enclosure with concomitant health and safety issues.

Figure 2:
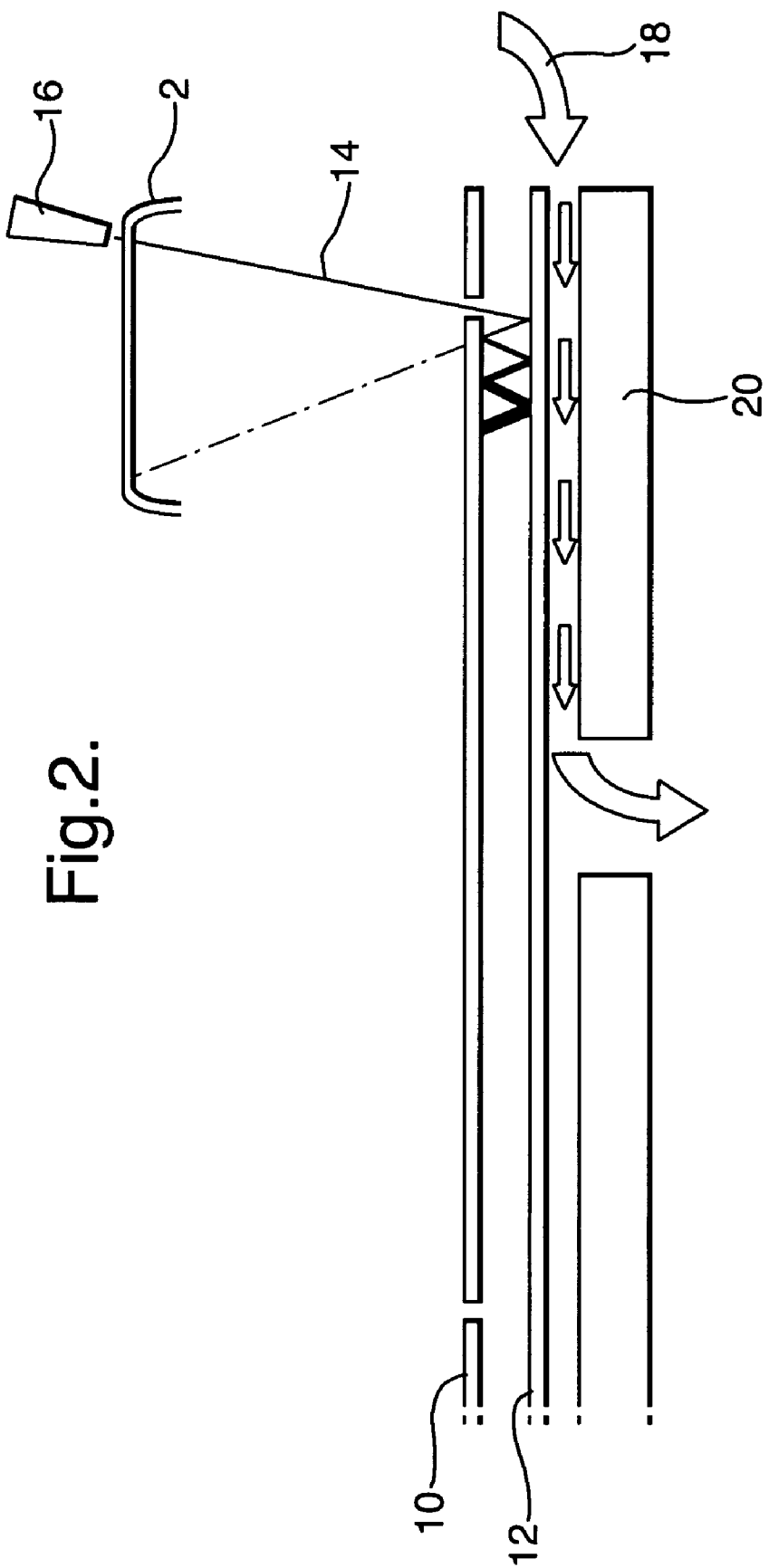
FIG. 2 depicts the path of a beam when applied to the equipment of FIG. 1.

Accordingly a beam trap is provided to prevent damage to both machinery and the workpiece. The beam trap of the invention and shown in FIG. 1 and FIG. 2 is elegant and cheap. The beam trap comprises two parallel aluminium plates 10, 12 that are spaced apart from each other. The beam trap does not rotate with the combustor head, but alternatively is in a fixed position relative to the laser beam.

The upper plate 10 is provided with an aperture through which the beam 14 from the laser 16 passes at an angle to enter the beam trap.

The beam reflects off the lower plate 12 back to the upper plate where it is similarly reflected. As shown in FIG. 2, the beam is repeatedly reflected between the lower plate 12 and the upper plate 10. At each reflection a proportion of the beam energy is absorbed by the plate in addition to being diffused such that the energy of the beam per unit area is reduced.

The plates are made of aluminium, which is cheap and highly reflective and therefore absorb less energy from each incidence of the laser than other materials such as steel. The material of choice enables the beam trap to survive for a relatively large number of aperture forming processes before replacement.

The plates are preferably disc like and rotatable independently of the combustor component and fixtures and have a plurality of apertures through which the beam may be directed. Once the laser has been directed through one of the apertures for a predetermined number of cooling hole forming processes, and certainly before either of the plates is significantly damaged, the beam trap is rotated to present one of the further apertures to the beam path. Subsequent beams are therefore directed to different points within the beam trap than during the previous cooling hole forming processes and consequently the life of the beam trap can be extended and its useable surface maximised.

The plates are preferably in a fixed arrangement with each other, though it would not depart from the inventive concept of this invention to have the lower plate rotatable relative to the upper plate. In this arrangement the beam may be directed through a first aperture for a given period determined either by time, or by the number of laser pulses passing through the aperture.

Beneficially, a flow of cooling air 18 is passed between the first plate 12 and the fixture base 20. The air absorbs heat from the beam trap and prevents the temperature of the plates from rising significantly.

It will be appreciated that a beam trap in accordance with the invention would be cheap to make, simple and could be a disposable component. It allows high-power lasers to be used without risk of damaging the component being machined, the fixtures or the machine enclosure.

The beam traps of the invention also increase manufacturing possibilities. For example, larger holes may be formed using a trepanning or pilot hole technique. In both these methods a smaller hole is initially formed which is widened either by moving the beam around the circumference of the smaller hole in a gradually widening spiral (trepanning), or using a static beam of greater diameter than the pilot beam. It will be appreciated that in both these techniques the beam trap must trap a significant proportion of the beam energy during the hole forming process.

As an additional feature the aluminium plates may have a scattering effect in addition to the reflective effect. Beneficially, the scattering of the beam quickly dissipates the beam energy. The scattering effect may be provided by a region of increased roughness at the locality upon which the beam is incident.

Whilst the invention has been described by reference to machining a combustor head it will be appreciated that it is equally applicable to machining holes in the wall of a combustor, or other components where the use of a static laser is desired.

Various modifications may be made without departing from the scope of the invention.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A machining apparatus for machining a component, the machining apparatus comprising:
   a beam generator for generating a beam to be directed along a beam path and at the component to be machined, and
   a beam trap having opposing faces and a plurality of apertures disposed such that the beam is directed to enter the beam trap through one of the apertures
   and is dissipated by repeated reflection off the first to the second face and off the second face to the first face, the beam trap being rotatable to dispose another of the apertures in the beam path.

2. The machining apparatus of claim 1, wherein the opposing faces are parallel.

3. The machining apparatus of claim 1, wherein the opposing faces are provided by aluminium plates.

4. The machining apparatus of claim 1, wherein the beam trap further comprises an aperture through which the beam enters the beam trap.

5. The machining apparatus of claim 1, wherein the beam generator and the beam trap are in fixed arrangement and the beam generator is configured to generate the beam for directing at the component that is movable relative to the beam generator.

6. The machining apparatus of claim 5, wherein beam generator is configured to generate the beam for directing at the component that is rotatable relative to the beam generator.

7. The machining apparatus of claim 1, wherein the component is annular.

8. The machining apparatus of claim 1, wherein the component provides at least part of a combustor for a gas turbine engine.

9. The machining apparatus of claim 1, wherein the beam is a laser beam.

10. The machining apparatus of claim 1, wherein the beam generator is a $CO_2$ laser.

11. A method of machining a component comprising:
    directing a beam at the component from a beam generator to form a hole within the component;
    subsequently passing the beam through the hole to a beam trap having a first surface and a second opposing surface and a plurality of apertures such that the beam is directed to enter the beam trap through one of the apertures, wherein the beam directed to the beam trap is reflected off the first surface to the second opposing surface; and
    rotating the beam trap to dispose another of the apertures in the beam path.

* * * * *